United States Patent [19]

Mosher et al.

[11] Patent Number: 5,079,703
[45] Date of Patent: Jan. 7, 1992

[54] 3-DIMENSIONAL MIGRATION OF IRREGULAR GRIDS OF 2-DIMENSIONAL SEISMIC DATA

[75] Inventors: Charles C. Mosher; David D. Thompson, both of Plano, Tex.

[73] Assignee: Atlantic Richfield Company, Los Angeles, Calif.

[21] Appl. No.: 481,868

[22] Filed: Feb. 20, 1990

[51] Int. Cl.$^5$ .......................... G01V 1/00; G06F 15/00
[52] U.S. Cl. ................................. 364/421; 364/422; 367/51; 367/53; 367/72; 395/127
[58] Field of Search ............................ 367/53, 51, 72; 364/421, 521, 522

[56] References Cited

U.S. PATENT DOCUMENTS

| | | | |
|---|---|---|---|
| 4,363,113 | 12/1982 | Taner et al. | 364/421 |
| 4,745,585 | 5/1988 | Larner | 367/50 |
| 4,888,742 | 12/1989 | Beasley | 367/50 |
| 4,964,103 | 10/1990 | Johnson | 367/53 |

OTHER PUBLICATIONS

Yilmaz, *Seismic Data Processing* (Society of Exploration Geophysicists, 1987), pp. 252–261, 402–407.

McQuillin, et al., *An Introduction to Seismic Interpretation* (Gulf Publishing Co., Houston, 1984), pp. 92–97.

*Primary Examiner*—Allen R. MacDonald
*Assistant Examiner*—Xuong M. Chung
*Attorney, Agent, or Firm*—Vinson & Elkins

[57] ABSTRACT

A method and apparatus for deriving a three-dimensional seismic image from an irregular grid of two-dimensional seismic data is provided. The two-dimensional seismic data incldue a plurality of shot lines. For each of the shot lines, a two-dimensional migration is performed therealong (22) to create a plurality of migrated shot lines. For each of a plurality of three-dimensional image points, the following substeps are performed. A migrated trace (X) is selected from each of the migrated shot lines that is closest to the image point (I). A further migration (30) is performed on each selected migrated trace (28) with respect to the image point (I). A three-dimensional migrated image (30) comprising the image points is thereby obtained. The invention allows the use of historical, irregular two-dimensional grids of seismic data to be efficiently used for the three-dimensional imaging of subsurface features.

20 Claims, 1 Drawing Sheet

3-DIMENSIONAL MIGRATION OF IRREGULAR GRIDS OF 2-DIMENSIONAL SEISMIC DATA

TECHNICAL FIELD OF THE INVENTION

The present invention relates in general to seismic data processing, and more particularly to a method and apparatus for migrating an irregular grid of 2-dimensional seismic data to produce a regular, migrated 3-dimensional image.

BACKGROUND OF THE INVENTION

The generation of seismic images is used to determine subsurface geological features of interest in hydrocarbon exploration. Seismic imaging has been conventionally performed by causing a seismic disturbance on the surface, and recording seismic waves on each of a plurality of receivers strung along a shot line. Particularly in marine use, an air gun array is used as the wave source, and a trailing cable of hydrophone receivers which can be approximately 10,000 feet long are used to receive reflected waves. Each receiver records pressure wave amplitude as a function of time. These data are then used to assemble a graph or array of data in the (x,t) plane, with the x axis being coaxial with the shot line and the t axis representing the time in which reflection wave phenomena are received back at each receiver.

Using these data, traveltime profiles are built up in each (x,t) plane. Conventional processing techniques are used to transform these traveltime profiles in the (x,t) plane by seismic imaging into depth profiles in the (x,z) plane, where z denotes depth. The depth profiles ideally correspond to a geologic section taken along the same shot line.

The raw traveltime profile exhibits artifacts that distort the image. Among these are a shift in both the x direction and in the amount of slope of dipping reflectors, which are strata that slope downward in relation to the shot line. Other artifacts, known as diffraction hyperbolae, are created from prominent diffraction points. These artifacts make interpretation of the raw traveltime or depth profiles difficult or impossible.

Several techniques have been developed in the prior art for removing or reducing the strength of these artifacts such that a more interpretable depth or traveltime profiles may be obtained. Once such technique, known as migration, moves dipping reflectors into their true subsurface positions and collapses diffractions, thereby delineating detailed subsurface features such as fault planes. These migrations are commonly performed using a single shot line of data, such that one (x,z) depth profile will have increased spatial resolution. Such migrations are called 2-dimensional (2-D) migrations. One type of 2-D migration is the diffraction summation or Kirchhoff summation migration, and will be explained in more detail in the Detailed Description of the Invention below.

2-D migrations of data still do not produce completely valid images because (1) diffraction hyperbolae might be due to diffraction sources that lie outside of the (x,t) plane of the shot line data, and (2) the subsurface will generally dip in a direction other than one that is either parallel to (strike) or perpendicular to (in-line) the shot line. To solve this problem, 3-dimensional (3-D) migrations have been performed that use an array of data obtained from a regular array of parallel shot lines. If the migration velocity field does not have large lateral gradients, an excellent approximation to 3-D migration is obtained by performing 2-D migration along the lines parallel to the shot line data, and then along a series of lines perpendicular to the shot lines. A few hundred thousands to a few million traces are normally collected during a 3-D survey. This makes 3-D migrations based on new data extremely costly.

Many areas have been explored extensively over the years with 2-D seismic data. Often the available data forms a dense grid of irregularly oriented seismic lines having widely variable vintage. Several investigators have therefore attempted to conform irregular grids of 2-D data to a regular grid for subsequent input into a standard 3-D migration process. This is because practical techniques such as fine-difference or FK migrations require the input data to be uniformly sampled on a rectangular grid. To develop the rectangular grid, prior investigators have developed very elaborate, labor-intensive methods for interpolating the unmigrated stacked data from the available seismic lines onto a regular grid for subsequent input into a standard 3-D migration process. This interpolation is often very difficult, particularly since it must be performed on unmigrated data often having diffractions and crossing events which defy interpretive analysis.

A need has therefore arisen to find a migration algorithm which will accept the irregular grid of input data and produce a 3-D migrated output having uniform spatial sampling required for a 3-D interpretation. The Kirchhoff migration algorithm known in the art has just these features. Unfortunately, conventional applications of this method have been considered grossly impractical for 3-D processing because they require an enormous amount of input/output activity and CPU time.

SUMMARY OF THE INVENTION

The present invention provides a practical way to use Kirchhoff migration to directly produce a 3-D migrated image from an irregular, dense grid of 2-D data. According to one aspect of the invention, the orientation of each of a plurality of lines in an irregular grid of data is determined. Next, for each line, a 2-D migration is performed so as to move the data along a hyperbolic diffraction path coplanar with the shot line until a point is reached that is closest to the diffraction source. Next, a 3-D grid orientation and spacing is set, including a plurality of image points. For each of the image points, the nearest trace is collected from each migrated 2-D line to the image point. This will produce a collection of traces. Finally, one migrated output trace is formed from this collection of traces.

The present invention provides a practical way to apply the power of the 3-D migration process to existing grids of 2-D data. Many areas such as the Gulf of Mexico have been intensively explored using 2-D seismic data. The 3-D migration method of the invention allows the use of existing grids of 2-D data to produce reservoir images needed to guide development drilling and to identify extension opportunities. Since a regular 3-D grid of data need not be accumulated, large expenditures in acquiring largely redundant 3-D data are saved. Even in areas having inadequate 2-D coverage, it may only be necessary to infill with a small number of additional 2-D lines to permit accurate 3-D imaging using this technique.

BRIEF DESCRIPTION OF THE DRAWINGS

Further aspects of the invention and their advantages will be discerned by reading the following Detailed Description when taken in conjunction with the Drawings, in which.

DETAILED DESCRIPTION OF THE INVENTION

Huygen' Secondary Sources

Diffraction sources can be modelled as Huygens' secondary sources, as they respond to seismic waves by generating semicircular wave fronts in the (x,z) plane. The response in the (x,t) plane is a diffraction hyperbola.

A reflecting horizon in a subsurface may be modelled as containing several Huygens' secondary sources that each produce hyperbolic traveltime curves. As the sources get closer to each other, superposition of the hyperbolae produces the response of the actual reflecting interface. However, discontinuities of the reflector will produce diffraction hyperbolae that will remain even after the hyperbolae from the rest of the reflecting surfaces are superimposed. The last hyperbolae are equivalent to diffractions seen at fault boundaries on stacked sections. Reflectors in the subsurface can therefore be visualized as being made up of many points that act as Huygens' secondary sources.

Kirchhoff Migration

The diffraction summation or Kirchhoff migration algorithm is a method of removing diffraction artifacts and of correcting the slope and position of dipping reflectors based on the summation of amplitudes along hyperbolic paths. It consists of searching the input data in (x,t) space for energy that would have resulted if a diffracting source (Huygens' secondary source) were located at a particular point in the output (x,z) space. This search is carried out by summing the amplitudes in (x,t) space along the diffraction curve that corresponds to a Huygens' secondary source at each point in the (x,z) space. The result of this summation is then mapped onto the corresponding point of the (x,z) space.

Figure 1:
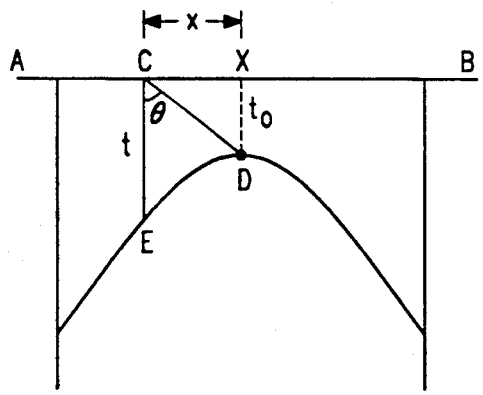
FIG. 1 is a schematic diagram of an (x,t) plane containing a shot line AB and including a diffraction point D, showing a hyperbolic diffraction curve emanating therefrom.

FIG. 1 is a schematic diagram of a zero-offset section in the (x,t) plane that contains a diffraction point D, and a hyperbolic trajectory emanating therefrom that includes the point E. Points C and X lie along the shot line AB, with point X being immediately above the diffraction point D in the (x,z) plane and point C displaced therefrom by a quantity x. The angle between C and diffraction point D relative to the vertical is $\theta$. The traveltime between C and E is denoted as t, while the traveltime denoted between the diffraction point D and the center point X is $t_0$. From the triangle CXD:

$$t^2(x) = t^2(0) + 4x^2/v^2_{rms}. \quad (1)$$

where zero is defined as point X and $v_{rms}$ is the root mean square velocity at the apex of the hyperbola at time t(0).

After computing the input time t(x), the amplitude at input location E is placed on an output section at location D, corresponding to an output time $\tau = t(0)$ at the apex of the hyperbola.

The wave amplitude at point D is stronger than the wave amplitude at point E. This angle dependence of amplitudes, or obliquity factor, must be considered before summation. To perform this obliquity factor correction, the amplitude at location E is scaled by the cosine of the angle between CE and CD before it is placed at the output location D.

Another factor that must taken into account is the spherical divergence of wave amplitude, or spherical spreading. The wave amplitude along the wave front at location C, which is further from the point aperture source D than point E and is therefore weaker in wave amplitude. Wave energy decays as $1/r^2$ where r is the distance between the source to the wavefront, while amplitudes decay as $(1/r)$. Thus, amplitudes must be scaled by a factor $(1/r)^{\frac{1}{2}}$ before summation for wave propagation in 2-D.

A third, final factor involves an inherent property of the Huygens' secondary source waveform. Huygens' secondary sources must respond as a wavelet along the hyperbolic path with a certain phase and frequency characteristic. Otherwise, there would be no amplitude cancellation when they are close to one another. The waveform that results from the summation must be restored in both phase and amplitude.

The Kirchhoff migration incorporates these three factors. The obliquity factor is given by the cosine of the angle $\theta$ between the direction of propagation and the vertical axis z. The spherical spreading factor is given for 2-D wave propagation as proportional to $(1/r)^{\frac{1}{2}}$. A wavelet shaping factor is designed with a 45° constant phase spectrum and an amplitude spectrum proportional to the square root of frequency for 2-D migration.

An integral solution of the scalar wave equation gives the output wave field $P_{out}(x,z,t)$ at a subsurface location (x,z) from the 0-offset wave field $P_{in}(x_{in}, z=0, t)$, which is measured at the surface (z=0). The integral solution of the Kirchhoff. migration is set forth as follows:

$$P_{out}(x,z,t) = \frac{1}{2\pi} \int dx \left[ \frac{\cos\theta}{r^2} P_{in}(x_{in}, z = 0, t - r/v) + \quad (2) \right.$$

-continued $$\frac{\cos\theta}{vr} \frac{\partial}{\partial t} P_{in}(x_{in}, z = 0, t - r/v) \Bigg].$$

where v is the RMS velocity at the output point (x,z), and $$r = [(x_{in} - x)^2 + z^2], \tag{3}$$

which is the distance between the input ($x_{in}$, z=0) and the output (x,z) points. P(x,z,t) is usually expressed in Pascals, as the data recorded is pressure data.

To obtain a migrated section at an output time $\tau$ equation (2) must be evaluated as z=v $\tau$/2 and the imaging principle must be invoked by mapping amplitudes of the resulting wave field at t=0 onto the migrated section at output time $\tau$. The complete migrated section is obtained by performing the integration in setting t=0 for each output location. The integration is taken along the shot line. In a preferred embodiment, the first term of the integral is dropped because it is negligible in comparison to the second term, also known as the far-field term. A more complete treatment of Huygens' principle and Kirchhoff migration, and conventional 3-D migration may be found within the textbook by Ozdogan Yilmaz, *Seismic Data Processing*, Society of Exploration Geophysicists, Tulsa, Okla., 1987.

Prior Art 3-D Migration

Figure 2:
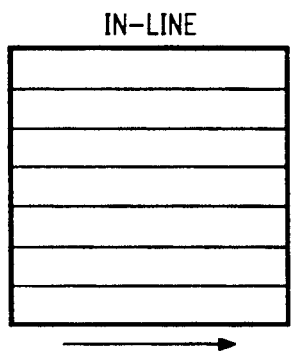
FIG. 2 is a schematic diagram showing in-line 2-D migration according to the prior art, using a regular grid of seismic data.
Figure 3:
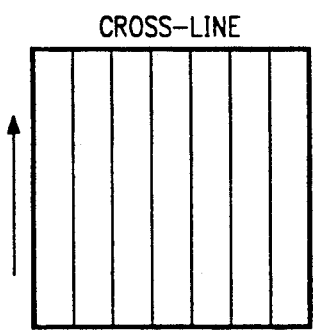
FIG. 3 is a schematic diagram showing a plurality of cross-line migrations performed after in-line migrations have been performed according to FIG. 2.

Referring next to FIGS. 2 and 3, the prior art method of 3-D migration will next be described. The seismic data is initially acquired in a regular grid of parallel shot lines, or irregular 2-D seismic data is attempted to be fit or interpolated into a regular grid for later processing. As above mentioned, this interpolation is often very difficult. Next, referring particularly to FIG. 2, a series of 2-D migrations are done in-line, that is, in a direction parallel to the series of shot lines. This will collect energies toward points on each of the parallel lines that are closest to respective diffraction points, which diffraction points may however be removed from the lines. Next, a series of cross-line migrations are performed, as shown in FIG. 3. Each of the cross-line migrations is performed in a direction perpendicular to the initial shot line grid. Energy is thus moved from locations coplanar in respective (x,t) plane to the shot line to the correct, 3-D dimensional location. The conventional method causes difficulties in correctly interpolating the unmigrated data. Interpolation usually requires detailed dip analysis and is highly interpretive and ambiguous. Crossing events and diffractions cause particular confusion.

The 3-D Migration Process of the Invention

Figure 4:
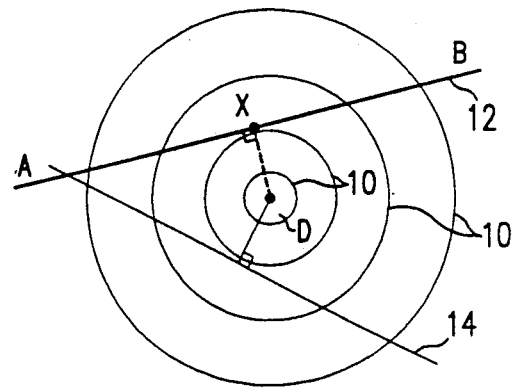
FIG. 4 is a schematic plan diagram showing a plurality of isograms of diffracted energy formed on the surface of a hyperboloid of revolution having a diffraction source D at its apex, and crossed by a plurality of shot lines, one of which is shown as line AB.

In contrast, the process of the present invention does not require a regular grid of 2-D data, nor any presummation attempts to fit irregular data into one. Referring to the plan view shown in FIG. 4, a diffraction point D produces a hyperboloidal diffraction trajectory downward in (x,y,t) space, as represented by several isograms 10 that are on a surface of a hyperboloid of revolution. In mapping the subsurface area, several shot lines, including shot lines 12 and 14, cross this hyperboloid surface at random angles. Taking in particular shot line AB, there will be a point X on the shot line that is closest to the diffraction point D. The line XD is necessarily at right angles to the shot line AB. Referring briefly back to FIG. 1, a first general step of the invention is to perform a conventional 2-D Kirchhoff migration along the shot line AB to migrate the data to point X, the closest point on the shot line AB to the actual diffraction source. Then, a second 2-D Kirchhoff migration is performed at right angles to the shot line AB, as shown in FIG. 4. Thus, seismic energy can correctly be migrated to the diffraction point D in FIG. 4 with only two migrations per shot line.

Figure 5:
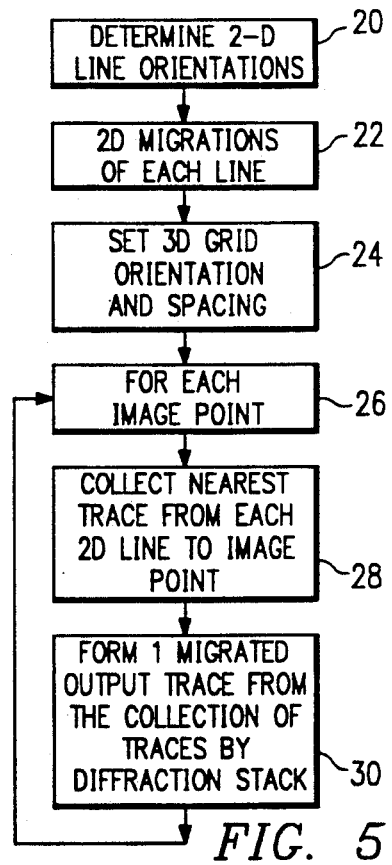
FIG. 5 is a schematic block diagram of steps taken in a 3-D migration process according to the invention.
Figure 6:
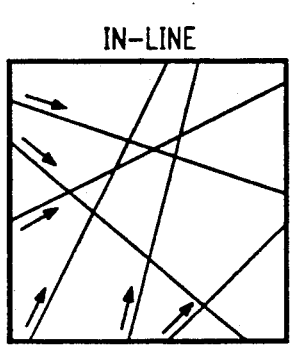
FIG. 6 is a plan view of a representative, simplified irregular grid of 2-D data, showing a step of in-line migration according to the invention.

FIG. 5 is a flow diagram representing various successive steps in a 3-D migration process according to the invention, as may be performed on a computer. At a first step 20, the line orientations of each of a plurality of shot lines within an irregular grid of 2-D data are determined. A representative simplified plan view of a number of such shot lines are shown in FIG. 6. The orientation of each 2-D line is performed in the preferred embodiment by identifying each 2-D line by an x,y,$\theta$ format. X is equal to the zero intercept. Y is a point on the shot line that is nearest to the zero intercept. $\theta$ is the angle made between the line segment x,y and some arbitrary reference. Next, at step 22, a 2-D migration such as Kirchhoff 2-D migration, is performed on each of the shot lines. This will focus energy along each line at point(s) closest to one or more respective diffraction sources. The migrated 2-D shot lines are then stored.

At step 24, a 3-D grid is superimposed on the irregular grid of seismic data. Its orientation and spacing is selected and set. The 3-D grid defines a plurality of equally spaced-apart image points that will be loci for the output data.

A loop is started at step 26. A first image point of the 3-D grid is chosen. Then, at step 28, the nearest trace from each 2-D line, such as point X on line AB in FIG. 4, is collected. If energy has been collected at this point as a result of the 2-D migration performed on the line, then this energy will be available for collection to the image point. Otherwise, no previously migrated diffracted data will be available for migration to the image point from the 2-D line. The nearest trace is collected in this manner from each of the migrated shot lines within the 3-D grid.

Figure 7:
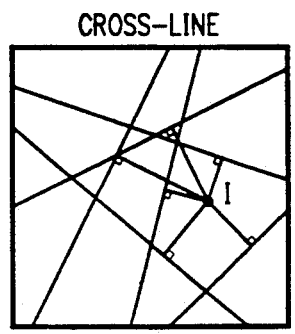
FIG. 7 is a plan view of the irregular grid of 2-D data as shown in FIG. 6, further illustrating a step of cross-line migration to an image point according to the invention.

The second step in the 3-D migration process is schematically illustrated in FIG. 7. The current image point is denoted as I. 2-D Kirchhoff migration has been performed for each of the irregular grid shot lines within the Figure. A point is selected on each of these shot lines that is closest to the image point I. The line between this point and the image point is always at right angles to the original shot line.

At step 30, one migrated output trace is formed from the collection of the migrated traces as collected in step 28. This is performed by diffraction stack. The procedure then loops back to step 26, where the next image point in the grid is taken and the process repeated. The output image points together form a migrated 3-D image in (x,y,t) space.

For best results, the 3-D migration process of the invention should be performed within an aperture located well inside a well-developed irregular grid of 2-D data. In this manner, boundary effects can be minimized.

The process of the invention may be performed by computer using algorithms that can be constructed by persons having ordinary skill in the art, once they are given the detailed description of the process steps herein. In order to perform the 3-D migration of the invention in a reasonable amount of time, the computer used should have a floating point calculation speed of approximately $10^{10}$ floating point operations per second. FORTRAN or other well-known scientific computer program languages can be used to construct a computer program according to the invention; since these languages and the associated computer programming techniques are well within the ordinary skill of the art, they are not described here.

In summary, a novel method and apparatus have been disclosed that allows the efficient use of 3-D migration using archival irregular 2-D seismic data. The invention allows efficient migrations of the raw data, wherein draping diffractions can be collapsed inward, sharp changes focussed and dipping reflectors corrected as to slope and position.

While a preferred embodiment of the present invention and its advantages have been described in the above detailed description, the invention is not limited thereto, but only by the scope and spirit of the appended claims.

What is claimed is:

1. A method for deriving a three-dimensional seismic image from two-dimensional seismic data arranged according to a plurality of shot lines in a survey area, comprising the steps of:
   representing said seismic data in a representation which corresponds to the spatial relationship of the shot lines in the survey area;
   for each portion of said seismic data corresponding to each of said shot lines, performing a two-dimensional migration thereof to generate migrated seismic data in the form of a plurality of migrated traces corresponding to each shot line;
   selecting a plurality of image points in said representation, said image points corresponding to points in said survey area;
   for each of said selected image points, performing the substeps of:
     selecting the migrated trace for each of said plurality of migrated shot lines that is closest to the image point in said representation; and
     for each selected migrated trace, performing a migration with respect to the image point; and
   forming a migrated three-dimensional image using the results of said migrations of said selected migrated traces with respect to said image points.

2. The method of claim 1, wherein said step of performing a two-dimensional migration comprises the step of performing a Kirchhoff migration.

3. The method of claim 2, wherein said step of performing a Kirchhoff migration uses only the far-field term thereof.

4. The method of claim 1, wherein said step of performing a migration on each selected migrated trace with respect to the image point comprises the step of performing a Kirchoff migration.

5. The method of claim 4, wherein said step of performing a Kirchhoff migration uses only the far-field term thereof of said Kirchhoff migration.

6. The method of claim 1, wherein said representation is in (x,y,t) space.

7. The method of claim 1, wherein each of said steps of performing migrations comprise performing diffraction summations.

8. The method of claim 1, wherein each of said steps of performing migrations are for correcting representations of the position and angle of dipping reflectors in the survey area.

9. The method of claim 1, wherein said plurality of shot lines are not parallel to one another.

10. The method of claim 1, wherein said step of creating a representation comprises:
    associating an angle value and an intercept value with each of said shot lines.

11. The method of claim 1, wherein said step of creating a representation is prior to said step of performing two-dimensional migrations.

12. A method for producing a migrated three-dimensional seismic image from two-dimensional seismic data from a plurality of shot lines in a seismic survey area, comprising the steps of:
    creating a representation of the survey area according to the position and the orientation of each of the shot lines relative to one another;
    for the portion of the seismic data corresponding to each shot line, performing a two-dimensional migration to produce a plurality of migrated shot lines;
    selecting a plurality of image points in said representation;
    for each image point, performing the following substeps:
      for each migrated shot line, selecting a migrated trace therein in such a manner that a line drawn in said representation from the selected image point to the selected trace is perpendicular to the migrated shot line;
      performing a two-dimensional migration of each selected trace with respect to the image point; and
      summing the migrated selected traces to form an output trace corresponding to the image point.

13. The method of claim 12, wherein each of said steps of performing two-dimensional migrations comprise performing Kirchoff migrations.

14. The method of claim 12, wherein each of said steps of performing two-dimensional migrations are for correcting representations of the position and angle of sub-surface dipping reflectors in the survey area.

15. The method of claim 12, wherein said plurality of shot lines are not parallel to one another.

16. The method of claim 12, wherein said step of creating a representation comprises:
    associating an angle value and an intercept value with each of said shot lines.

17. The method of claim 12, wherein said step of creating a representation is performed prior to said step of performing two-dimensional migrations to produce a plurality of migrated shot lines.

18. A computer for creating three-dimensional representations of stored two-dimensional seismic data, taken from a plurality of shot lines in a survey area, said computer programmed to perform the steps of:
    representing said seismic data in a representation which corresponds to the spatial relationship of the shot lines in the survey area;
    for each portion of said seismic data corresponding to each of said shot lines, performing a two-dimensional migration thereof to generate migrated seismic data in the form of a plurality of migrated traces corresponding to each shot line;
    selecting a plurality of image points in said representation, said image points corresponding to points in said survey area;

for each of said selected image points, performing the substeps of:
  selecting the migrated trace for each of said plurality of migrated shot lines that is closest to the image point in said representation; and
  for each selected migrated trace, performing a migration with respect to the image point; and
storing, for each of said image points, the results of said migrations of said selected migrated traces performed therewith, to form a migrated three-dimensional image of the survey area.

19. The computer of claim 18, programmed to perform the additional step of displaying the three-dimensional image of the survey area.

20. The computer of claim 18, wherein the stored seismic data is taken from shot lines which are not parallel to one another in the survey area.

* * * * *